United States Patent [19]

Iida

[11] Patent Number: 4,966,012
[45] Date of Patent: Oct. 30, 1990

[54] AIR-CONDITIONER FOR AUTOMOBILE

[75] Inventor: Katsumi Iida, Konan, Japan

[73] Assignee: Diesel Kiki Co., Ltd., Tokyo, Japan

[21] Appl. No.: 446,285

[22] Filed: Dec. 5, 1989

[51] Int. Cl.$^5$ ............................................. F25D 17/08
[52] U.S. Cl. .................................... 62/180; 62/228.5;
62/244; 62/203; 62/213; 165/42; 236/13;
236/91 C; 236/91 E
[58] Field of Search .............. 62/180, 186, 179, 228.4,
62/228.5, 229, 203, 208, 209, 239, 243, 244, 213;
236/91 R, 91 C, 91 D, 91 E, 91 F, 49.3, 13;
98/2.01; 165/35, 36, 41, 42, 43, 16, 30

[56] References Cited

U.S. PATENT DOCUMENTS

| 4,488,411 | 12/1984 | Hara ...................................... 62/228.5 |
| 4,560,106 | 12/1985 | Dorsch .............................. 236/91 E |
| 4,582,124 | 4/1986 | Yjoshimi et al. ..................... 62/228.5 |
| 4,617,986 | 10/1986 | Kobayashi et al. ................. 236/91 C |
| 4,877,081 | 10/1989 | Ohtsu ..................................... 165/43 |

Primary Examiner—Harry Tanner
Attorney, Agent, or Firm—Wenderoth, Lind & Ponack

[57] ABSTRACT

An automobile air-conditioner wherein a total signal corresponding to a thermal load in the passenger compartment of an automobile and a head part total signal corresponding to a thermal load in the vicinity of the head of an occupant of the passenger compartment, then the thus obtained two total signals are used to determine two corresponding states of operation of a component involved in air-conditioning operation, and operation of the air-conditioning component is controlled based on one of the two total signals which is capable of providing an enhanced coolness to the occupant. According to a preferred embodiment, all the components involved in the air-conditioning operation are controlled based on the head part total signal.

7 Claims, 7 Drawing Sheets

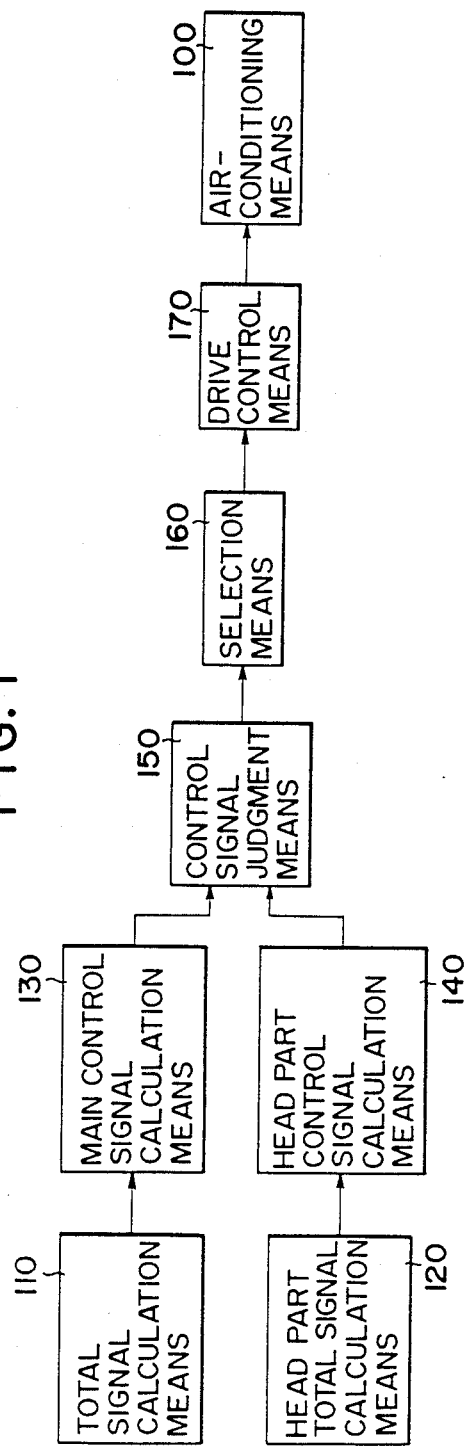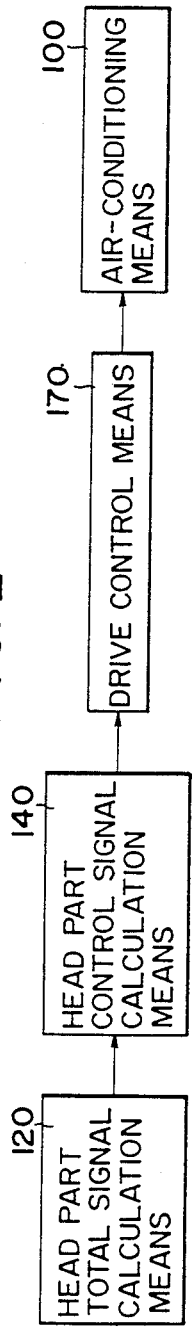

AIR-CONDITIONER FOR AUTOMOBILE

BACKGROUND OF THE INVENTION

1. Field of the Invention:

The present invention relates generally to an air-conditioner for automobiles, and more particularly to an automobile air-conditioner incorporating a cooled air bypass unit for controlling the temperature of an upper part of the vehicle passenger compartment in the vicinity of the head of an occupant.

2. Description of the Prior Art:

Cooled air bypass units are conventionally used in an automobile air-conditioner for lowering the temperature of air in the vicinity of the head of an occupant of an automobile while the automobile is running in the sun. According to Japanese Utility Model Publication No. 59-34497 and Japanese Utility Model Laid-open Publication No. 60-151710, a main air-flow duct has an opening at a position immediately downstream of an evaporator, a cooled air bypass door disposed at the opening to open and close the opening, and a cooled air bypass duct provided separately from the main air-flow duct and connected at its one end to the opening, the other end of the cooled air bypass duct being connected to a vent opening or solely constituting an upper opening facing toward the face of the occupant. With this arrangement, the head of the occupant can be cooled while the automobile is running in the sun, and more particularly when the solar radiation becomes maximum, so that the air-conditioning feeling can be improved.

The opening and closing operation of the bypass door of the known cooled air bypass unit is controlled depending on the vehicle passenger compartment temperature or the solar radiation quantity. However, since the control of the bypass door is performed independently of the control of other component of the air-conditioner, the desired cooling effect can be obtained only when the amount of bypassed cooled air is fairly large (about 50%) relative to the amount of main airflow which is controlled by a total control signal.

As the internal space of an instrument panel of the automobile is narrowed by other necessary parts, for example, components of the main air-flow duct, there is no room available for the installation of a relatively large cooled air bypass duct capable of providing a sufficient amount of bypassed cooled air. In practice, the amount of bypassed cooled air is only about 10% of the total amount of air discharge into the passenger compartment and hence a sufficient cooling of the head of the occupant is difficult to achieve.

SUMMARY OF THE INVENTION

With the foregoing difficulties in view, it is an object of the present invention to provide an automobile air-conditioner having a cooled air bypass control function which is capable of refreshing the head of an occupant while keeping harmony with the main air-conditioning provided by conditioned air discharged from a main air-flow duct.

Another object of the present invention is to provide an automobile air-conditioner for controlling the air-conditioning operation of a main air-flow duct a cooled air bypass duct according to a same signal which is obtained in view of thermal conditions in the vicinity of the head o the occupant, thereby providing a head part of the occupant with a feeling of sufficient coolness.

According to a first aspect of the present invention, there is provided an air-conditioner for an automobile, comprising: air-conditioning means for varying the state of air-conditioning in a passenger compartment of the automobile, the air-conditioning means including cooled air bypass means for leading air into the passenger compartment immediately after it passes around the evaporator; total signal calculation means for calculating a total signal corresponding to a thermal load in the passenger compartment based on at least a vehicle passenger compartment temperature, a setting temperature and an outside air temperature; head part total signal calculation means for calculating a head part total signal corresponding to a thermal load in the vicinity of the head of an occupant based on at least a temperature in the vicinity of the occupant, a head part setting temperature and a solar radiation quantity; main control signal calculation means for calculating a first control signal based on the total signal for setting the state of operation of the air-conditioning means; head part control signal calculation means for calculating a second control signal based on the head part total signal for setting the state of operation of the air-conditioning means; control signal judgment means for comparatively judging the magnitude of the result of calculation by the main control signal calculation means and the result of calculation by the head part control signal calculation means; selection means for selecting one of the result obtained by the main control signal calculation means and the result obtained by the head part control signal calculation means based on the result of judgment performed by the control signal judgment means; and drive control means for controlling the operation of the air-conditioning means based on the result of selection by the selection means.

With this construction, the total signal for the conventional control of main air-conditioning operation and the head part total signal corresponding to the thermal load in the vicinity of the head of the occupant are calculated for determining two control signals each effective to set the state of control of the air-conditioning means. The two control signals are compared and one of them which is capable of providing a greater coolness to the occupant is selected for controlling the operation of the air-conditioning means. Thus, the head part of the occupant is refreshed without affecting the state of main air-conditioning operation.

According to a second aspect of the present invention, there is provided an air-conditioner for an automobile, comprising: air-conditioning means for varying the state of air-conditioning in a passenger compartment of the automobile, the air-conditioning means including cooled air bypass means for leading air into the passenger compartment immediately after it passes around the evaporator; head part total signal calculation means for calculating a head part total signal corresponding to a thermal load in the vicinity of the head of an occupant based on at least a temperature in the vicinity of the occupant, a head part setting temperature and a solar radiation quantity; head part control signal calculation means for calculating a control signal based on the head part total signal for setting the state of operation of the air-conditioning means; and drive control means for controlling the operation of the air-conditioning means based on the result of calculation by the head part control signal calculation means.

With this construction, the air-conditioning means is solely controlled based on the head part total signal which is equivalent to the thermal load in the vicinity of the head of the occupant with the result that an air-conditioning aimed mainly to refreshing of the head part of the occupant can be realized.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a functional block diagram of an automobile air-conditioner according to a first embodiment of the present invention;

FIG. 2 is a functional block diagram of an automobile air-conditioner according to a second embodiment of the present invention;

DETAILED DESCRIPTION

Figure 3:
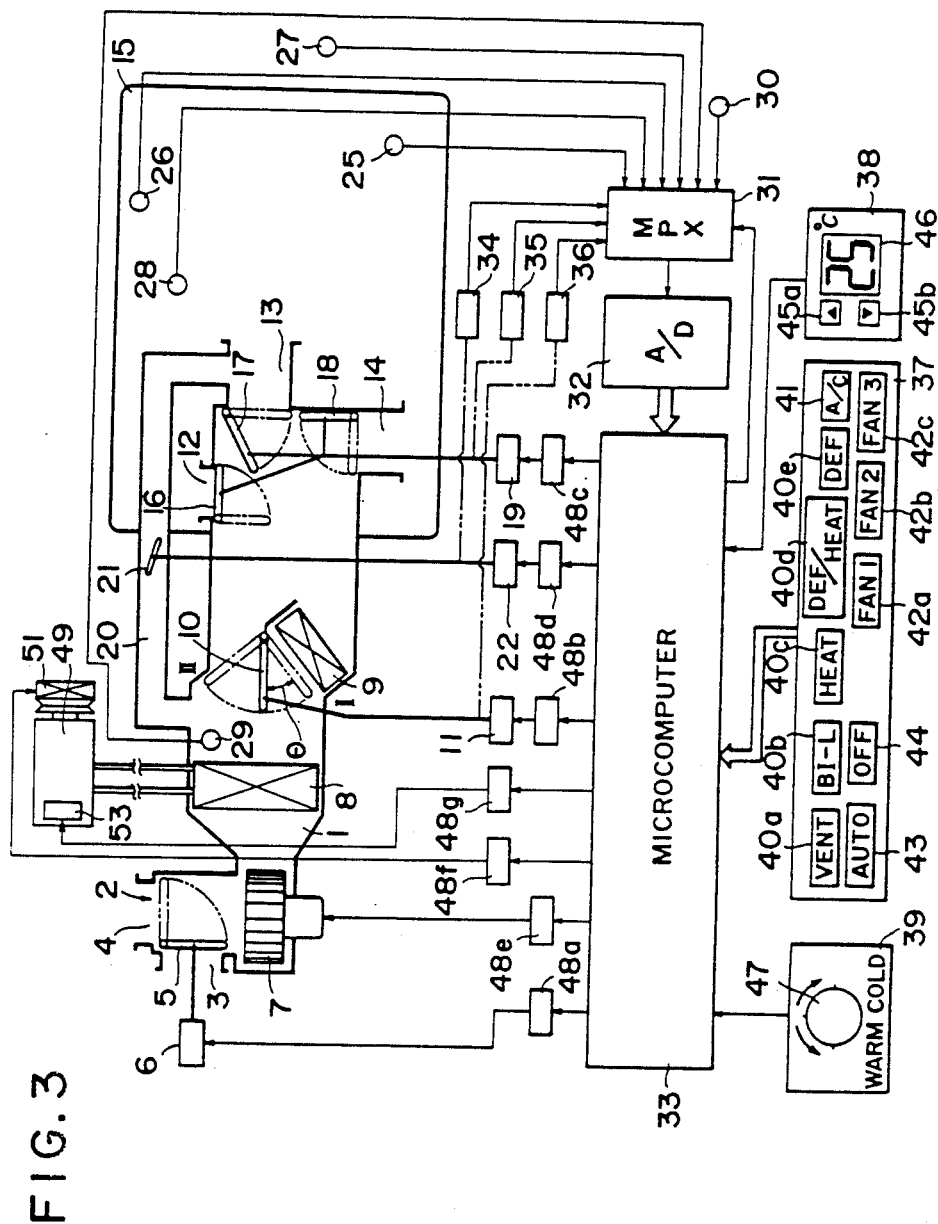
FIG. 3 is a diagrammatical view illustrative of the general construction of an automobile air-conditioner according to the present invention.

The present invention will be described hereinbelow in greater detail with reference to a first embodiment shown in FIG. 1 of the accompanying drawings.

As shown in FIG. 1, an air-conditioner for an automobile generally includes air-conditioning means 100 for varying the state of air-conditioning in a passenger compartment of the automobile, the air-conditioning means including cooled air bypass means for leading air into the passenger compartment immediately after it passes around the evaporator; total signal calculation means 110 for calculating a total signal corresponding to a thermal load in the passenger compartment based on at least a vehicle passenger compartment temperature, a setting temperature and an outside air temperature; head part total signal calculation means 120 for calculating a head part total signal corresponding to a thermal load in the vicinity of the head of an occupant based on at least a temperature in the vicinity of the occupant, a head part setting temperature and a solar radiation quantity; main control signal calculation means 130 for calculating a first control signal based on the total signal for setting the state of operation of the air-conditioning means 100; head part control signal calculation means 140 for calculating a second control signal based on the head part total signal for setting the state of operation of the air-conditioning means 100; control signal judgment means 150 for comparatively judging the magnitude of the result of calculation by the main control signal calculation means 130 and the result of calculation by the head part control signal calculation means 140; selection means 160 for selecting one of the result obtained by the main control signal calculation means 130 and the result obtained by the head part control signal calculation means 140 based on the result of judgment performed by the control signal judgment means 150; and drive control means 170 for controlling the operation of the air-conditioning means 100 based on the result of selection by the selection means 160.

As shown in FIG. 3, the automobile air-conditioner according to the present invention includes a main airflow duct 1 having an intake door changeover device 2 disposed at the upstream end of the main air-flow duct 1. The intake door changeover device 2 includes a selecting door 5 disposed at the junction between a recirculated air inlet 3 and an outside air inlet 4 that are provided in bifurcated fashion. The selecting door 5 is actuated by an actuator 6 to select the outside air or the recirculated air to be introduced into the main air-flow duct 1.

A blower 7 is disposed in the duct 1 adjacent to the air inlets 3, 4 for forcing the air to flow downstream through the main air-flow duct 1. The duct 7 also includes an evaporator 8 and a heater core 9 disposed downstream of the blower 7 in the order named.

The evaporator 8 is connected in fluid circuit with a compressor 49, a condenser (not shown), etc. to jointly constitute a refrigeration cycle or system for cooling air passing around the evaporator 8. The heater core 9 serves to heat air passing therearound with the agency of heat exchange action between the air and an engine cooling water circulating through the heater core 9.

The compressor 49 is of the variable displacement type such, for example, as the wobble plate or swash plate type variable displacement compressor. The swash plate compressor 49 is provided with a displacement adjusting device 53 for electrically controlling the displacement of the compressor 49 from the outside of the compressor 49. Such a compressor 49 is known per se and hence a description is not necessary. The compressor 49 is coupled in driven relation with an engine of the automobile via an electromagnetic clutch 51 and driven by the engine power.

Disposed in front of the heater core 9 is an air-mix door 10 pivotally movable by an actuator 11 for varying the ratio of the amount of air flowing directly through the heater core 9 to the amount of air bypassing the heater core 9 depending on the opening $\theta$ of the air-mix door 10. The air passed through the heater core 9 and the air bypassed the heater core 9 are then mixed up into temperature-conditioned air of a desired temperature.

The opening $\theta$ of the air-mix door 10 is 0% when the air-mix door 10 is located at the full cool position indicated by I in FIG. 3 and 100% when the air-mix door 10 is located at the full heat position indicated by II in the same figure.

The main air-flow duct 1 has at its downstream end a defroster outlet 12, a vent outlet 13 and a heat outlet 14 that are provided in branched fashion and all open to a vehicle compartment 15. Three mode doors 16, 17, 18 are disposed at the respective outlets 12, 13, 14 and adapted to be selectively opened and closed by an actuator 9 to set a desired discharge mode of the air-conditioner.

The air-conditioner further includes a bypass duct 20 for bypassing a length of the main air-flow duct 1. The bypass duct 20 has one end connected to the main airflow duct 1 at a position between the evaporator 8 and the air-mix door 10, the opposite end of the bypass duct 20 being connected to the main air-flow duct 1 at a position in front of the vent outlet 13 so that a part of cooled air having passed through the evaporator 8 is directly supplied to the vent outlet 13. The amount of cooled air supplied through the bypass duct 20 is adjusted by controlling the opening of a cooled air bypass door 21 by means of an actuator 22.

Denoted by 25 is a representative temperature sensor disposed on an instrument panel, for example, of the automobile for detecting a representative temperature $T_R$ in the passenger compartment 15. A head part temperature sensor 26 is disposed on the inside surface of the roof panel of the automobile for detecting a temperature $T_{Rh}$ in the vicinity of an occupant of the passenger compartment 15. Designated by 27 is an outside air temperature sensor for detecting an outside air temperature $T_A$ and 28 is a solar radiation sensor for detecting a solar radiation quantity $T_S$. A mode sensor 29 is disposed on or immediately downstream of the evaporator 8 for detecting a cooling capacity of the evaporator 8 in terms of a temperature of the evaporator 8 or a temperature of air passed through the evaporator 8. Reference numeral 30 denotes a cooling water temperature sensor for detecting a temperature of the engine cooling water. Output signals from the respective sensors 25–30 are selected by a multiplexer (MPX) 31, then converted by an A/D converter 32 into digital signals which in turn are inputted into a microcomputer 33.

Reference numeral 34 denotes a first opening sensor for detecting the opening of the cooled air bypass door 21, 35 a position sensor for detecting the position of the respective mode doors 16, 17, 18, and 36 a second opening sensor for detecting the opening of the air-mix door 10. Output signals from these sensors 34, 35, 36 are supplied through the multiplexer 31 and the A/D converter 32 to the microcomputer 33.

The microcomputer 33 is also supplied with output signals from an instrument panel 37, a temperature setter 38 and an upper part temperature setter 39.

The instrument panel 37 is provided with mode switches 40a–40e for manually setting the discharge mode to the vent (VENT) mode, the bi-level (BI-L) mode, the heat (HEAT) mode, the defrost/heat (DEF/-HEAT) mode, and the defrost (DEF) mode, an A/C switch 41 for starting the aforesaid refrigeration cycle, fan switches 42a–42c for selecting the rotational speed of the blower 7 between a low speed (FAN1), an intermediate speed (FAN2) and a high speed (FAN3), an auto switch (AUTO) 43 for automatically controlling all the components of the air-conditioner including the blower 7, and an off switch (OFF) for stopping the operation of the air-conditioner.

The temperature setter 38 is composed of up and down switches 45a, 45b and an indicator or display 46 for indicating a setting temperature $T_{St}$. The setting temperature $T_D$ indicated on the display 46 can be varied within a predetermined range by properly actuating the up and down switches 45a, 45b.

The head part temperature setter 39 has a graduated disk or dial 47 adapted to be turned to vary the head part setting temperature $T_{Sh}$ within a predetermined range (COLD-WARM). The temperature setter 38 and the head part temperature setter 39 may be of the slide type having a slidable temperature regulating lever.

The microcomputer 33 is of the conventional type known per se and includes a central processing unit (CPU), a read only memory (ROM), a random access memory (RAM), an input/output port (I/O), etc. (none of them shown). The microcomputer 33 serves to calculate control signals based on the various input signals stated above and output the control signals to the actuators 6, 11, 19, 22, a motor of the blower 7, the displacement adjustment device 53 and the electromagnetic clutch 51 respectively through driver circuits 48a–48g so as to control the operation of the respective doors 5, 10, 16, 17, 18, 21, the rotation of the blower motor, and the operation of the displacement adjustment device 53 and the electromagnetic clutch 51.

The control operation of the microcomputer 33 will be described below with reference to a flowchart shown in FIG. 4 in which a main control routine for calculating total signals is shown.

The main control routine of the microcomputer 33 starts in a step 50 in accordance with a program stored in the microcomputer 33. In the next step 52, various signals detected by the representative compartment temperature sensor 25, the head part temperature sensor 26, the solar radiation sensor 28, the outside temperature sensor 27, the mode sensor 29, etc. are inputted in the microcomputer 33.

Thereafter, the control goes on to a step 54 in which a total signal $T_1$ (main total signal) used for the main temperature control of the passenger compartment is calculated based on a representative temperature $T_R$, an outside air temperature $T_A$, a solar radiation quantity $T_S$, a temperature $T_E$ of the downstream side of the evaporator 8, and a passenger compartment setting temperature $T_{St}$. The calculation is achieved in accordance with the following equation (1).

$$T_1 = T_R + K_A T_A + K_S T_S + K_E T_E - K_{St} T_{St} + C_1 \qquad (1)$$

where $K_A$, $K_S$, $K_E$ and $K_{St}$ are gain constants and $C_1$ is a calculation constant.

In the next following step 56, another total signal $T_2$ (head part total signal) used for the control of head part temperature is calculated based on a head part temperature $T_{Rh}$, the solar radiation quantity $T_S$, a head part setting temperature $T_{Sh}$ in accordance with the following equation (2).

$$T_2 = K_H T_{Rh} + K_S T_S - K_{Sh} T_{Sh} + C_2 \qquad (2)$$

where $K_H$, $K_S$ and $K_{Sh}$ are gain constants and $C_2$ is a calculation constant.

In the next following control step 58, an operation is performed to calculate control values for the control of various components of the air-conditioner, namely the blower 7, the evaporator 8 and the air-mix door 10 that are controlled by the total signal $T_1$.

Figure 8:
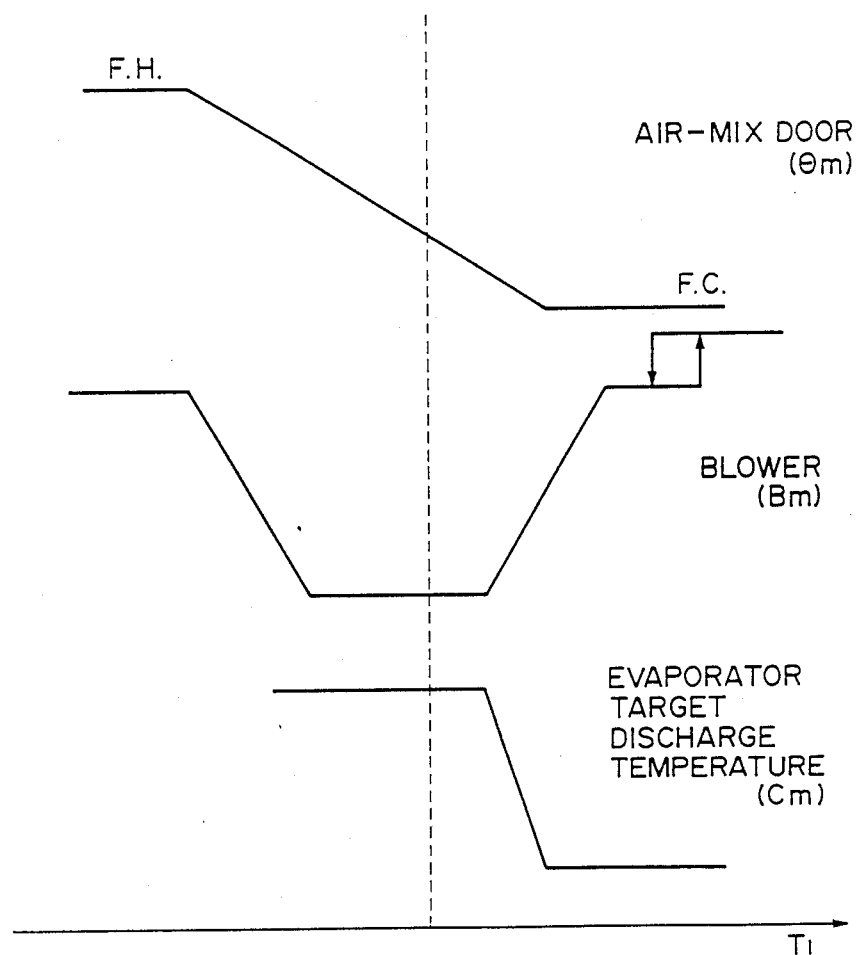
FIG. 8 is a graph showing a correlation between the air-mix door opening, the blower flow quantity and the evaporator target temperature that are taken with respect to the total signal $T_1$.

The control values for the respective air-conditioning components 7, 8, 10 are predetermined with respect to the total signal $T_1$ so as to realize the performance characteristic curves as shown in FIG. 8. Accordingly, each of the control values can be obtained by substituting $T_1$ for an equation indicative of a corresponding one of the performance characteristic curves. In FIG. 8, reference characters $\theta_m$, $B_m$ and $C_m$ denote an opening of the air-mix door 10, a flow quantity of the blower 7 and a target discharge temperature of the evaporator 8, respectively.

Then the control goes on to a step 60 in which an operation is performed to calculate control values for the control of various components of the air-conditioner, namely the blower 7, the evaporator 8, the air-mix door 10 and the cooled air bypass door 21 that are controlled by the total signal $T_2$.

Figure 9:
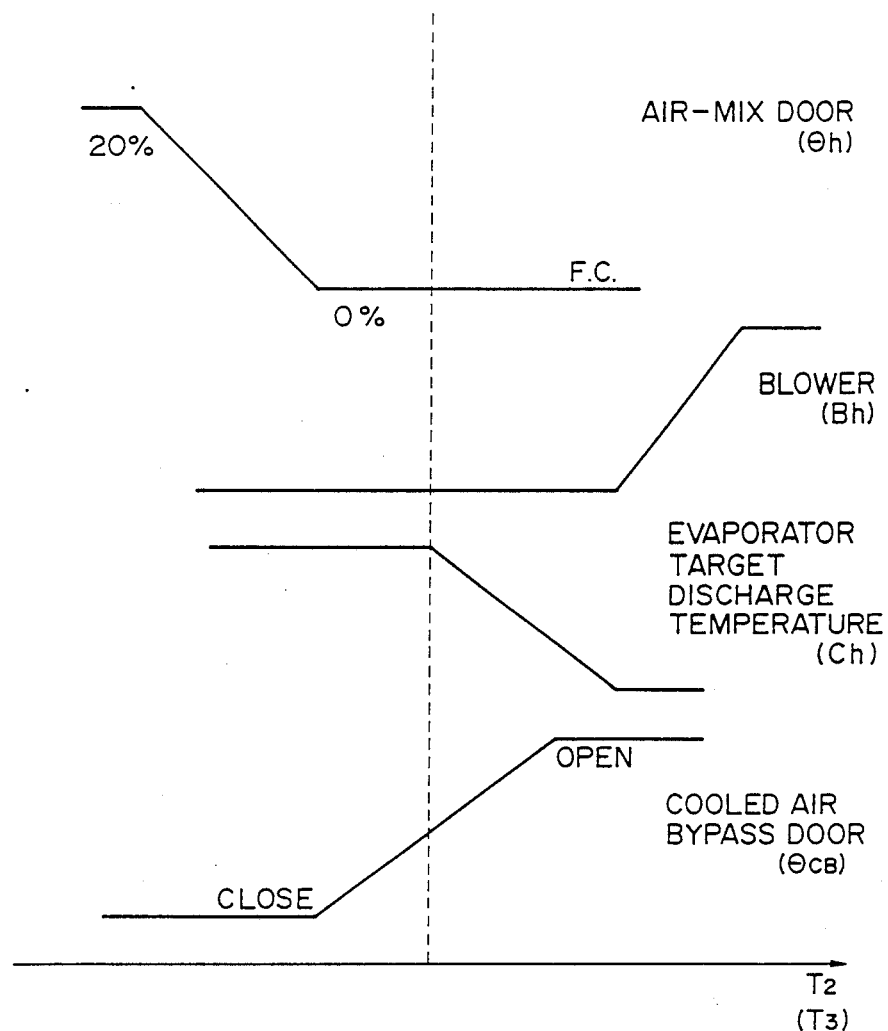
FIG. 9 is a graph showing a correlation between the air-mix door opening, the blower flow quantity and the evaporator target discharge temperature that are taken with respect to the total signal $T_2$ or $T_3$.

The control values for the respective air-conditioning components 7, 8, 10, 21 are predetermined with respect to the total signal $T_2$ so as to realize the performance characteristic curves as shown in FIG. 9. Accordingly, each of the control values can be obtained by substituting $T_2$ for an equation indicative of a corresponding one of the performance characteristic curves. In FIG. 9, reference characters $\theta_h$, $B_h$, $C_h$ and $\theta_{CB}$ denote an opening of the airmix door 10, a flow quantity of the blower 7, a target discharge temperature of the evaporator 8, and an opening of the cooled air bypass door 21, respectively. This control value calculation step 60 is followed by a step 62 for performing a control value selecting routine (described later). In the step 62, those control values which are determined based on the total signal $T_1$ for the control of the components such as air-mix door opening, the blower flow quantity, etc. are compared with those control values which are determined based on the total signal $T_2$ for the control of the same components and, based on their magnitudes, a judgment is made to determine as to which control signals are to be selected.

In the next following step 64, the operation of the components of the air-conditioner, namely the blower 7, the air-mix door, etc. are controlled according to the control signals selected in the step 62, thereby controlling the temperature in the passenger compartment.

Then the subroutine achieved for the selection of the control values will be described below with reference to the flowchart shown in FIG. 5.

The control subroutine of the microcomputer 33 starts from a step 70 and then proceeds to a step 72 in which a judgment is made to determine as to whether the current discharge mode is the vent mode or not. If yes, then the control proceeds to a step 74. Alternately, if no, the control goes on to a step 82.

In the step 82, those control values which are determined with respect to the total signal $T_1$ for the main temperature control (see step 58) is selected as control values for the control of the respective components involved in the air-conditioning operation, namely the blower 7, the air-mix door 10, etc.

On the other hand, in the step 74, the opening $\theta_m$ of the air-mix door 10 determined with respect to the total signal $T_1$ and the opening $\theta_h$ of the air-mix door 10 determined with respect to the total signal $T_2$ are compared for their magnitudes. If $\theta_m < \theta_h$, then the control goes on to a step 80 in which those control signals which are determined with respect to the total signal $T_2$ for the head part temperature control are selected as control values for the respective air-conditioning components (the blower 7, the air-mix door 10, etc).

If the comparison in the step 74 indicates $\theta_m \geq \theta_h$, then the control proceeds to a step 76 in which the flow quantity $B_m$ determined by the total signal $T_1$ is compared with the flow quantity $B_h$ of the blower 7 determined by the total signal $T_2$. If $B_m < B_h$, the control goes on to the step 80. Alternately, if $B_m \geq B_h$, then the control proceeds to a step 78. In this step 78, the target discharge temperature $C_m$ of the evaporator 8 determined by the total signal $T_1$ is compared with the target discharge temperature $C_h$ of the evaporator 8 determined by the total signal $T_2$. If $C_m > C_h$, the control goes on to the step 80. Alternately, if $C_m \leq C_h$, then the control goes on to the step 82 described above.

Figure 4:
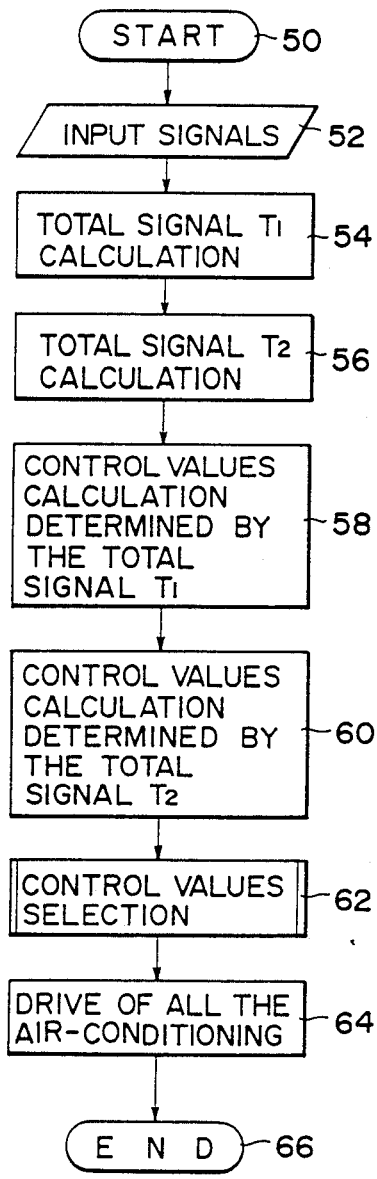
FIG. 4 is a flowchart showing a main control routine achieved by a microcomputer incorporated in the automobile air-conditioner shown in FIG. 3.

After the control operation of the step 82 or the step 80 is completed, the control goes on to a step 84 from which the control returns to the main routine described above with reference to the flowchart shown in FIG. 4.

Figure 5:
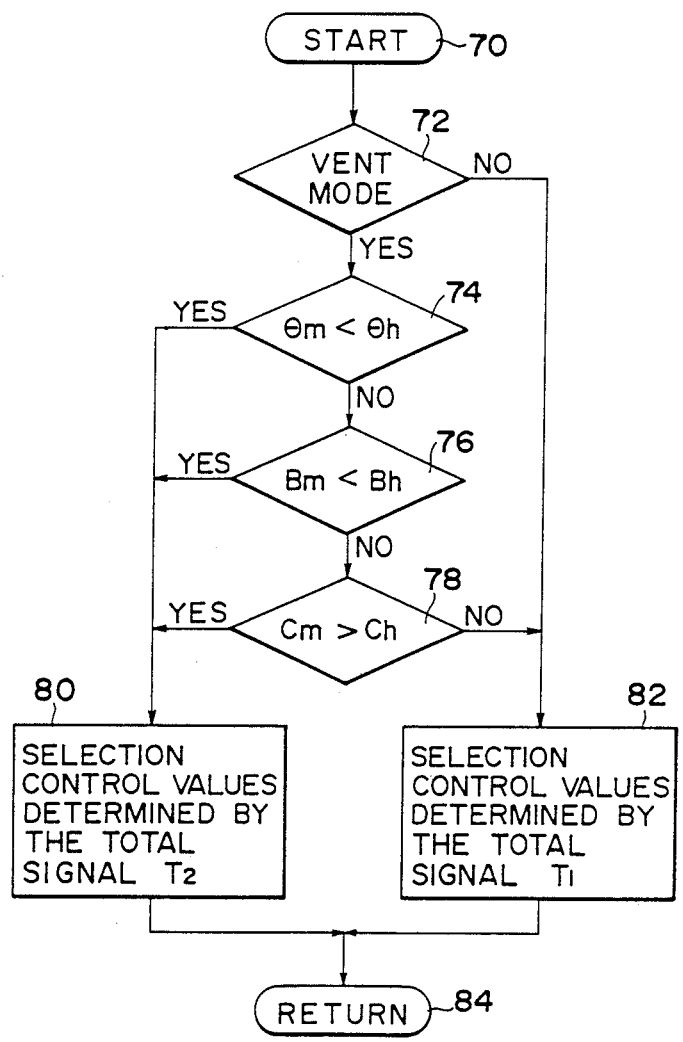
FIG. 5 is a flowchart showing a control subroutine achieved for the selection of control value according to the first embodiment of the invention.

As described above, with respect to each of the opening of the air-mix door, the flow quantity of the blower and the target discharge temperature of the evaporator 8, a control value determined by the total signal $T_1$ and a control value determined by the total signal $T_2$ are compared and, if at least one of three pairs of the thus compared control values meets the condition indicated by the corresponding inequity shown in the flowchart of FIG. 5, those control values which are determined by the total signal $T_2$ (used for the head part temperature control) are selected. Conversely, if none of the conditions indicated by the respective inequities in the flowchart shown in FIG. 5 is not satisfied, then those control signals which are determined by the total signal $T_1$ (used for main temperature control) are selected. Accordingly, the operation of the respective air-conditioning components is controlled based on the total signal which is capable of providing a feeling of enhanced coolness in the vicinity of the head of the occupant to thereby refreshing the head part of the occupant.

The target discharge temperature of the evaporator 8 is controlled by means of the displacement adjusting device 53 of the variable displacement compressor 49 in a manner described below. The displacement adjusting device 53 is of the type as disclosed in Japanese Patent Publication No. 1-244916 and includes an electromagnetic valve for adjusting the degree of communication between a crank chamber and an intake chamber, and a control circuit for the electromagnetic valve. Since the opening of the electromagnetic valve varies with the magnitude of an exciting current supplied to the electromagnetic valve, the displacement of the compressor 49 is variable with a change in the exciting current and hence the cooling capacity of the evaporator 8 varies with the exciting current.

Accordingly, by controlling the exciting current supplied to the electromagnetic valve of the displacement adjustment device 53, the temperature of the evaporator 8 can be equalized to the target discharge temperature.

Figure 6:
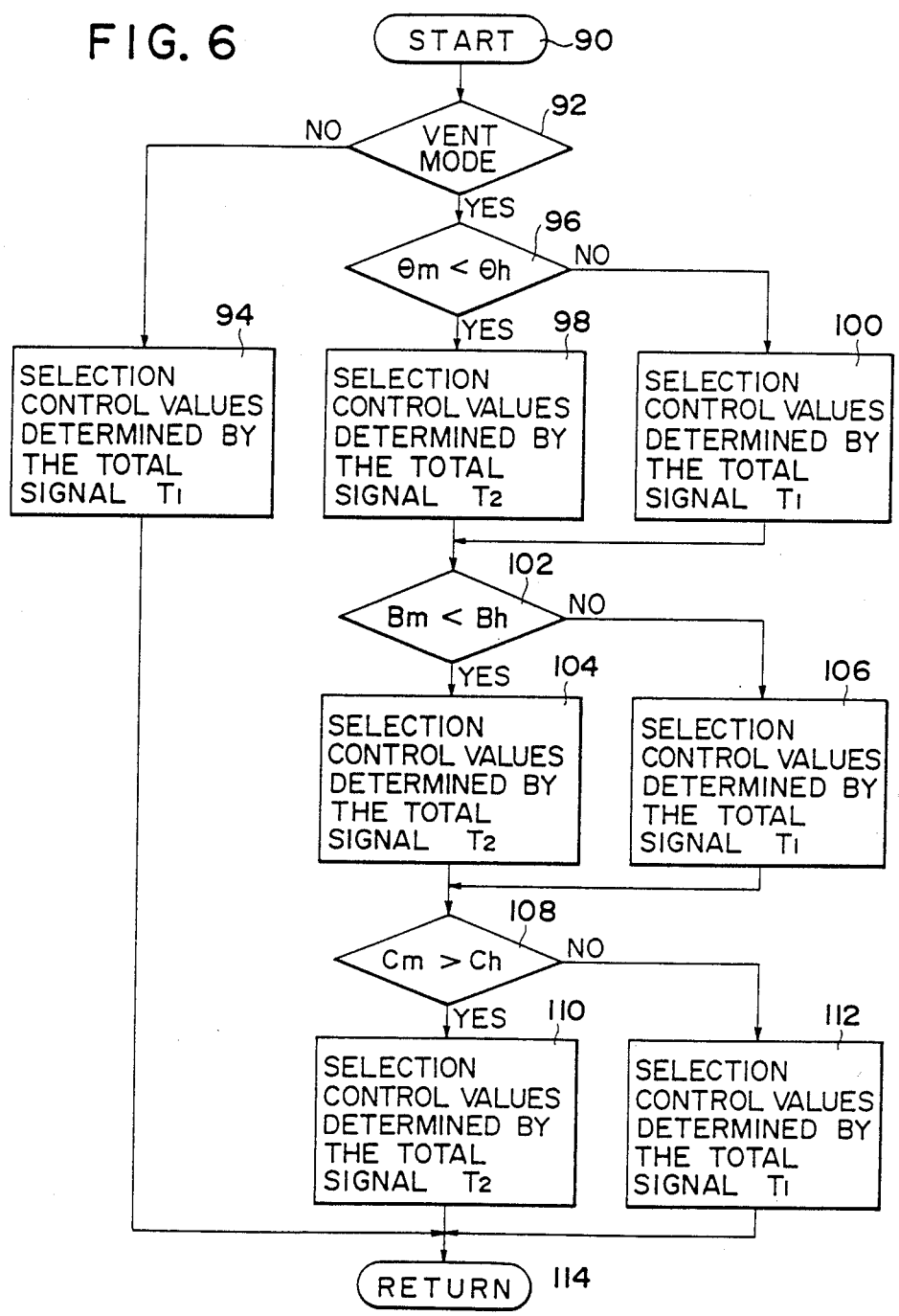
FIG. 6 is a flowchart showing a control subroutine achieved for the selection of control value according to another embodiment.

FIG. 6 shows a control signal selecting routine according to another embodiment.

The microcomputer 33 starts operating in a step 90 and in the next following step 92 it is determined whether the current discharge mode is the vent mode or not. If yes, the control proceeds to a step 96. Alternately, if the current discharge mode is not the vent mode, then the control goes on to a step 94.

In the step 94, those control values which are determined by the total signal $T_1$ for the main temperature control are selected as control values for the control of various components involved in the air-conditioning operation.

On the other hand, in the step 96, the opening $\theta_m$ of the air-mix door 10 determined with respect to the total signal $T_1$ and the opening $\theta_h$ of the air-mix door 10 determined with respect to the total signal $T_2$ are compared for their magnitudes. If $\theta_m < \theta_h$, then the control proceeds to a step 98. Conversely, if $\theta_m \geq \theta_h$, the control goes on to a step 100. In the step 100, the same selection as in the step 94 is performed and the control proceeds to a step 102. Conversely in the step 98, those control signals which are determined by the total signal $T_2$ for the head part temperature control are selected as control signals for the respective air-conditioning components. Then the control goes on to the step 102.

In the step 102, the flow quantity $B_m$ of the blower 7 determined according to the total signal $T_1$ is compared with the flow quantity $B_h$ of the blower 7 determined by the total signal $T_2$. If $B_m < B_h$, the control proceeds to a step 104. Alternately, if $B_m \geq B_h$, then the control goes on to a step 106. In the step 104, the same selection as done in the step 98 is made and thereafter the control proceeds to a step 108. On the other hand, in the step 106, the same selection as done in the step 94 is made and then the control goes on to the step 108. In the step 108, the target discharge temperature $C_m$ of the evaporator 8 determined by the total signal $T_1$ is compared with the target discharge temperature $C_h$ of the evaporator 8 determined by the total signal $T_2$, and if $C_m \leq C_h$, the control proceeds to in a step 110. Alternately, if $C_m \leq$ Cphd h, then the control goes on to a step 112. In the step 110, the same selection as done in the step 98 is made. On the other hand, in the step 112, the same selection as done in the step 94 is made. The steps 110, 112 is followed to a step 114 from which the control returns to the main control routine indicated by the flowchart shown in FIG. 4.

As described above, with respect to each of the opening of the air-mix door 10, the flow quantity of the blower 7 and the target discharge temperature of the evaporator 8, a control value determined by the total signal $T_1$ and a control value determined by the total signal 2 are compared and, if each pair of the thus compared control values meets the condition indicated by the corresponding inequity shown in the flowchart of FIG. 6, the control value which is determined by the total signal $T_2$ (used for the head part temperature control) is selected. Conversely, if each respective condition indicated by a corresponding one of the inequities in the flowchart shown in FIG. 6 is not satisfied, then the control signal which is determined by the total signal $T_1$ (used for main temperature control) is selected. Thus, the operation of each individual air-conditioning component is controlled either by the total signal $T_1$ or the total signal $T_2$ based on a particular correlation established between two control signals determined by the total signals $T_1$ and $T_2$.

The present invention is further described with reference to an automobile air-conditioner according to a second embodiment shown in FIG. 2.

The automobile air-conditioner generally includes air-conditioning means 100 for varying the state of air-conditioning in a passenger compartment of the automobile, the air-conditioning means 100 including cooled air bypass means for leading air into the passenger compartment immediately after it passes around the evaporator; head part total signal calculation means 120 for calculating a head part total signal corresponding to a thermal load in the vicinity of the head of an occupant based on at least a temperature in the vicinity of the occupant, a head part setting temperature and a solar radiation quantity; head part control signal calculation means 140 for calculating a control signal based on the head part total signal for setting the state of operation of the air-conditioning means 100; and drive control means 170 for controlling the operation of the air-conditioning means 100 based on the result of calculation by the head part control signal calculation means 140.

The structural details of the automobile air-conditioner shown in FIG. 2 are the same as those shown in FIG. 3 and hence a description is no longer necessary.

Figure 7:
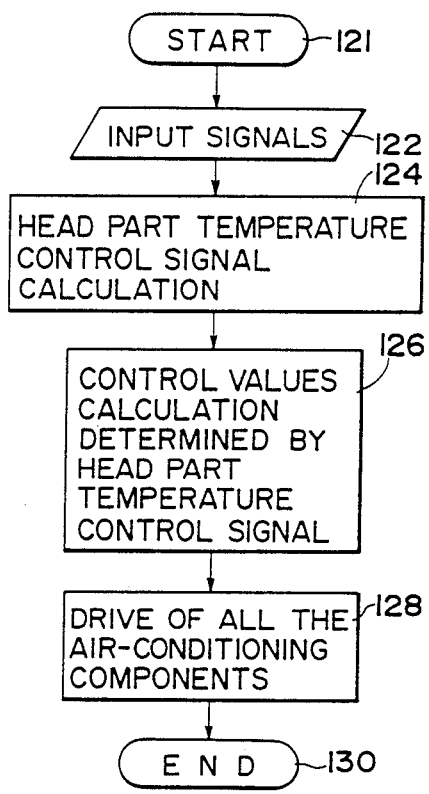
FIG. 7 is a flowchart showing a main control routine achieved according to the second embodiment of the present invention.

A description will be given to a control routine achieved by the microcomputer 33 indicated in the flowchart shown in FIG. 7.

The control routine of the microcomputer 33 starts from a step 121 and in the next following step 122, various output signals delivered from the head part temperature sensor 26, the solar radiation sensor 28, the head part temperature setter 39, etc. are converted into digital form and then inputted into the microcomputer 33. Thereafter, the control proceeds to a step 124 in which an operation is performed to calculate a head part temperature control signal $T_3$ based on the detected head part temperature $T_{Rh}$, the solar radiation quantity $T_S$, and the head part setting temperature $T_{Sh}$ in accordance with the following equation (3).

$$T_3 = AT_{Rh} + BT_S - CT_{Sh} + D \qquad (3)$$

where A, B and C are gain constants and D is a calculation constant.

In the next step 126, an operation is performed to calculate control signals used for the control of the respective components involved in the air-conditioning operation (i.e., the blower 7, the evaporator 8, the air-mix door 10 and the cooled air bypass door 21).

These control signals are indicated by the corresponding performance characteristic curves which are predetermined with respect to the head part temperature control signal $T_3$, as shown in FIG. 9. Therefore, the control signals can be obtained by substituting the value of $T_3$ calculated in the step 124 for equations indicative of the respective performance characteristic curves.

Then the control proceeds to a step 128 in which the operation of each of the respective air-conditioning components is controlled by a corresponding one of the control values calculated in the preceding step 126, thereby controlling the temperature of the passenger compartment. Thereafter, the control comes to an end at a step 130.

According to the foregoing embodiment, the temperature of the passenger compartment is controlled solely by the head part temperature control signal $T_3$, as against to the conventional temperature control of the passenger compartment which is achieved solely by the total signal $T_1$.

In the illustrated embodiment described just above, the number of data used for the calculation of the head part temperature control signal $T_3$ is three, namely the head part temperature $T_{Rh}$, the solar radiation quantity $T_S$, and the head part setting temperature $T_{Sh}$. However, one or more data such as the outside air temperature $T_A$ may be added to improve the accuracy of the control signal.

Obviously, various modifications and variations of the present invention are possible in the light of the above teaching. It is therefore to be understood that within the scope of the appended claims the present invention may be practiced otherwise than as specifically described.

What is claimed is:

1. An air-conditioner for an automobile, comprising:

(a) air-conditioning means for varying the state of air-conditioning in a passenger compartment of the automobile, said air-conditioning means including cooled air bypass means for leading air into the passenger compartment immediately after it passes around the evaporator;

(b) total signal calculation means for calculating a total signal corresponding to a thermal load in the passenger compartment based on at least a vehicle passenger compartment temperature, a setting temperature and an outside air temperature;

(c) head part total signal calculation means for calculating a head part total signal corresponding to a thermal load in the vicinity of the head of an occupant based on at least a temperature in the vicinity of the occupant, a head part setting temperature and a solar radiation quantity;

(d) main control signal calculation means for calculating a first control signal based on said total signal for setting the state of operation of said air-conditioning means;

(e) head part control signal calculation means for calculating a second control signal based on said head part total signal for setting the state of operation of said air-conditioning means;

(f) control signal judgment means for comparatively judging the magnitude of the result of calculation by said main control signal calculation means and the result of calculation by said head part control signal calculation means;

(g) selection means for selecting one of the result obtained by said main control signal calculation means and the result obtained by said head part control signal calculation means based on the result of judgment performed by said control signal judgment means; and (h) drive control means for controlling the operation of said air-conditioning means based on the result of selection by said selection means.

2. An air-conditioner according to claim 1, wherein said air-conditioning means further includes at least a variable displacement compressor.

3. An air-conditioner according to claim 2, wherein said head part control signal calculation means is operable to calculate at least control signals for said cooled air bypass means and said variable displacement compressor of said air-conditioning means.

4. An air-conditioner according to claim 1, wherein said air-conditioning means further includes at least a variable displacement compressor and a blower.

5. An air-conditioner according to claim 4, wherein said head part control signal calculation means is operable to calculate at least control signals for said cooled air bypass means, said variable displacement compressor and said blower of said air-conditioner.

6. An air-conditioner for an automobile, comprising:
(a) air-conditioning means for varying the state of air-conditioning in a passenger compartment of the automobile, said air-conditioning means including cooled air bypass means for leading air into the passenger compartment immediately after it passes around the evaporator;

(b) head part total signal calculation means for calculating a head part total signal corresponding to a thermal load in the vicinity of the head of an occupant based on at least a temperature in the vicinity of the occupant, a head part setting temperature and a solar radiation quantity;

(c) head part control signal calculation means for calculating a control signal based on said head part total signal for setting the state of operation of said air-conditioning means; and (d) drive control means for controlling the operation of said air-conditioning means based on the result of calculation by said head part control signal calculation means.

7. An air-conditioner according to claim 6, wherein said air-conditioning means further includes at least an air-mix door, blower and a variable displacement compressor.

* * * * *